United States Patent
Cho et al.

(10) Patent No.: US 11,518,433 B2
(45) Date of Patent: Dec. 6, 2022

(54) MOTOR DRIVEN POWER STEERING CONTROL METHOD AND MOTOR DRIVEN POWER STEERING CONTROL SYSTEM

(71) Applicants: Hyundai Motor Company, Seoul (KR); Kia Motors Corporation, Seoul (KR)

(72) Inventors: Jung Eun Cho, Sejong-si (KR); Young Min Go, Incheon (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 510 days.

(21) Appl. No.: 16/678,044

(22) Filed: Nov. 8, 2019

(65) Prior Publication Data

US 2020/0398888 A1    Dec. 24, 2020

(30) Foreign Application Priority Data

Jun. 24, 2019    (KR) .................. 10-2019-0074727

(51) Int. Cl.
| | | |
|---|---|---|
| *B62D 5/04* | (2006.01) | |
| *B62D 3/12* | (2006.01) | |
| *B62D 6/00* | (2006.01) | |
| *B62D 15/02* | (2006.01) | |
| *G01L 3/04* | (2006.01) | |
| *G01L 5/22* | (2006.01) | |

(52) U.S. Cl.
CPC ............ *B62D 5/0463* (2013.01); *B62D 3/12* (2013.01); *B62D 6/008* (2013.01); *B62D 15/021* (2013.01); *G01L 3/04* (2013.01); *G01L 5/221* (2013.01)

(58) Field of Classification Search
CPC ........ B62D 5/0463; B62D 3/12; B62D 6/008; B62D 15/021
See application file for complete search history.

(56) References Cited

U.S. PATENT DOCUMENTS

| | | | |
|---|---|---|---|
| 8,140,222 B2 | 3/2012 | Watanabe et al. | |
| 9,902,424 B2 | 2/2018 | Oshima | |
| 10,974,761 B2 * | 4/2021 | Han ..................... | B62D 5/0463 |
| 2006/0086560 A1 * | 4/2006 | Furusho .............. | B62D 5/0463 |
| | | | 180/446 |
| 2012/0253588 A1 | 10/2012 | Ghoneim | |

(Continued)

FOREIGN PATENT DOCUMENTS

| | | | | |
|---|---|---|---|---|
| CN | 105555643 A | * | 5/2016 | ........... B62D 5/0463 |
| CN | 107179682 B | * | 6/2020 | ............. G05B 11/42 |

(Continued)

OTHER PUBLICATIONS

Extended European Search Report dated Dec. 19, 2019 for European Patent Application No. 19169792.9.

*Primary Examiner* — Jacob D Knutson
(74) *Attorney, Agent, or Firm* — Morgan, Lewis & Bockius LLP

(57) ABSTRACT

A motor driven power steering control method may include setting a virtual friction model to a column connected between a steering wheel and a rack gear; calculating a frictional torque of the column by taking a steering angular speed of the steering wheel as an input parameter in the set virtual friction model; and calculating a target steering torque on the basis of a virtual steering system model using the frictional torque of the column as a parameter.

15 Claims, 10 Drawing Sheets

(56) References Cited

U.S. PATENT DOCUMENTS

| | | | |
|---|---|---|---|
| 2014/0343794 A1* | 11/2014 | Tamaizumi | B62D 5/0463 |
| | | | 701/42 |
| 2015/0203148 A1 | 7/2015 | Kuramitsu | |
| 2015/0239491 A1 | 8/2015 | Bolourchi et al. | |
| 2015/0353124 A1 | 12/2015 | Chai et al. | |
| 2017/0183031 A1* | 6/2017 | Ko | B62D 6/008 |
| 2019/0202454 A1* | 7/2019 | Komiyama | G08G 1/166 |

FOREIGN PATENT DOCUMENTS

| | | | | |
|---|---|---|---|---|
| DE | 10 2012 204 870 A1 | 10/2012 | | |
| DE | 10 2014 118 639 A1 | 7/2015 | | |
| EP | 2 003 040 A2 | 12/2008 | | |
| EP | 2 052 947 A1 | 4/2009 | | |
| EP | 1 081 018 A2 | 3/2011 | | |
| JP | 10-16809 A | 1/1998 | | |
| JP | 2004-50972 A | 2/2004 | | |
| JP | 2006-151360 A | 6/2006 | | |
| JP | 2008-302900 A | 12/2008 | | |
| JP | 2009-096265 A | 5/2009 | | |
| JP | 2009-101930 A | 5/2009 | | |
| JP | 5994481 B2 | 9/2016 | | |
| KR | 10-2015-0077988 A | 7/2015 | | |
| KR | 10-1684513 B1 | 12/2016 | | |
| KR | 10-2017-0019669 A | 2/2017 | | |
| KR | 10-2017-0115247 A | 10/2017 | | |
| KR | 10-2019-0041618 A | 4/2019 | | |
| WO | WO2004-085858 A1 | 10/2004 | | |
| WO | WO-2016017234 A1 * | 2/2016 | | B62D 5/0463 |
| WO | WO-2019082271 A1 * | 5/2019 | | B62D 5/0463 |

* cited by examiner (Before improvement)

(After improvement)

MOTOR DRIVEN POWER STEERING CONTROL METHOD AND MOTOR DRIVEN POWER STEERING CONTROL SYSTEM

CROSS-REFERENCE TO RELATED APPLICATION

The present application claims priority to Korean Patent Application No. 10-2019-0074727, filed on Jun. 24, 2019 in the Korean Intellectual Property Office, the entire contents of which is incorporated herein for all purposes by this reference.

BACKGROUND OF THE INVENTION

Field of the Invention

The present invention relates to a motor driven power steering system which includes a virtual steering system model reflecting a frictional torque of a column connected to a steering wheel estimated by using a virtual friction model, and a motor driven power steering method.

Description of Related Art

A motor driven power steering (MDPS) control based on an existing open loop may have different performances according to hardware distribution, and many repeated tuning operations are necessary to secure a desired target steering performance.

Meanwhile, the open-loop based control may be solved through a feedback control based on a closed loop.

That is, a target steering torque which is to be controlled may be generated in a lookup table manner to be feedback-controlled, and has an improved robustness of control and an improved tuning efficiency as compared with an open-loop manner.

However, in the feedback control, it is difficult to predict the performance of the control logic in the initial design step of the feedback controller, and a steering system using a virtual steering system model has been used to improve the development efficiency.

Meanwhile, although the frictional torque of the column connected to the steering wheel used in the conventional steering system model has been accurately estimated in a general driving condition, vibration is severe in a stop or low-speed driving condition.

The information disclosed in this Background of the present invention section is only for enhancement of understanding of the general background of the present invention and may not be taken as an acknowledgement or any form of suggestion that this information forms the related art already known to a person skilled in the art.

BRIEF SUMMARY

Various aspects of the present invention are directed to providing a virtual friction model that accurately estimates the frictional torque of a steering wheel in a stop or low-speed driving condition.

According to various aspects of the present invention, a motor driven power steering control method includes: setting a virtual friction model to a column connected between a steering wheel and a rack gear; calculating a frictional torque of the column by taking a steering angular speed of the steering wheel as an input parameter in the set virtual friction model; and calculating a target steering torque on the basis of a virtual steering system model using the calculated frictional torque of the column as a parameter.

The setting of the virtual friction model may include setting the frictional torque of the column to a sum of a damping torque and a stiffness torque set as nonlinear functions for the steering angular speed or a torsion displacement of the column, in the virtual friction model.

The damping torque may be set as a hyperbolic tangent function, in which the steering angular speed of the steering wheel is an input parameter.

The stiffness torque may be set as a polynomial function of two degrees or more, in which the torsional displacement of the column is an input parameter.

The setting of the virtual friction model may include setting the virtual friction model to reflect a stiction and Stribeck effect of the column.

The calculating of the target steering torque may include setting the virtual steering system model to calculate the target steering torque with an equation of state in which the steering angular speed and a rack force applied to a rack gear as input parameters.

The calculating of the target steering torque may include deriving the equation of state by setting the torsional displacement of the column, a momentum of the rack gear, a momentum of the steering wheel, and a feeding displacement of the rack gear as state parameters.

The calculating of the target steering torque may include calculating the target steering torque by reflecting an assist gain set by taking a speed of a vehicle as a parameter.

The motor driven power steering control method may further include, after the calculating of the target steering torque, feedback-controlling a steering motor to follow the calculated target steering torque.

According to various aspects of the present invention, a motor driven power steering control system includes: a frictional torque calculating unit configured to calculate a frictional torque of a column, which is connected between a steering wheel and a rack gear, by taking a steering angular speed of the steering wheel as an input parameter in a virtual friction model set to the column; a target steering torque calculating unit configured to calculate a target steering torque on the basis of a virtual steering system model using the frictional torque of the column calculated by the frictional torque calculating unit as a parameter; and a motor control unit configured to control the steering motor by using the target steering torque calculated by the target steering torque calculating unit.

According to the motor driven power steering control method and the motor driven power steering control system of the present invention, the vibration of the steering system may be improved by improving the accuracy of estimating the frictional torque of the steering wheel in a stop or low-speed driving condition.

Furthermore, steering feelings of various forms may be generated by securing the diversities of the generation of a target steering torque by freely tuning the characteristics of the steering system.

Furthermore, because steering performance may be predicted by calculating a target steering torque on the basis of a virtual steering system model, the development efficiency of the steering control technology may be improved.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
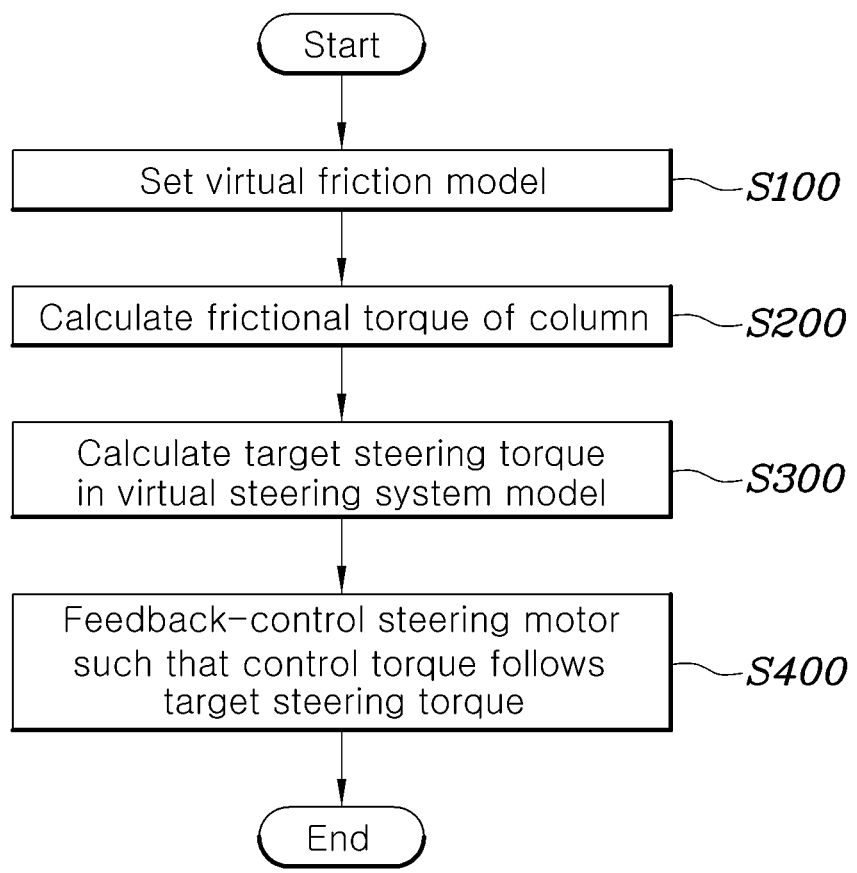
FIG. 1 is a flowchart of a motor driven power steering control method according to an exemplary embodiment of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

A specific structural or functional description of embodiments of the present invention disclosed in the specification or application is provided merely for the purpose of describing the embodiment according to an exemplary embodiment of the present invention. Therefore, the exemplary embodiments according to an exemplary embodiment of the present invention may be implemented in various forms, and the present invention should not be construed as being limited to the exemplary embodiments described in the specification or application.

Various changes and modifications may be made to the exemplary embodiments according to an exemplary embodiment of the present invention, and therefore various exemplary embodiments will be illustrated in the drawings and described in the specification or application. However, it should be understood that embodiments according to the concept of the present invention are not limited to the disclosed exemplary embodiments of the present invention, but the present invention includes all modifications, equivalents, and alternatives falling within the spirit and scope of the present invention.

Although the terms "ordinal numbers" such as first, second and the like may be used to describe various elements, the elements should not be defined by the terms. The terms are merely used to distinguish an element from another element, and thus a first element may be named a second element while the second element may be similarly named the first element, without departing from the scope of protection according to the concept of the present invention.

In the case where an element is referred to as being "connected" or "accessed" to other elements, it should be understood that not only the element is directly connected or accessed to the other elements, but also another element may exist between them. Contrarily, in the case where a component is referred to as being "directly connected" or "directly accessed" to other component, it should be understood that there is no component therebetween. The other expressions of describing a relation between structural elements, i.e. "between" and "merely between" or "neighboring" and "directly neighboring", should be interpreted similarly to the above description.

In the exemplary embodiment, the terms are merely used to describe a specific embodiment, and are not intended to limit the present invention. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof.

Unless defined differently, all terms used herein, which include technical terminologies or scientific terminologies, have the same meaning as that generally understood by a person skilled in the art to which an exemplary embodiment of the present invention belongs. It should be interpreted that the terms, which are identical to those defined in general dictionaries, have the meaning identical to that in the context of the related technique. The terms should not be ideally or excessively interpreted as a formal meaning unless not clearly defined.

Hereinafter, an exemplary embodiment of the present invention will be described in detail with reference to the accompanying drawings. Similar reference numerals presented in the drawings denote similar elements.

A motor driven power steering system, which may be applied to the present invention, is a steering system that generates a steering force or assists a steering force by using an electric motor, and may be a motor driven power steering (MDPS) system or a steering by wire (SBW) system.

The present invention relates to a method and a system that sets a target steering torque $T_{q\_ref}$ for controlling a motor driven power steering system including an electric motor and accordingly controls a motor driven power steering system.

Figure 2:
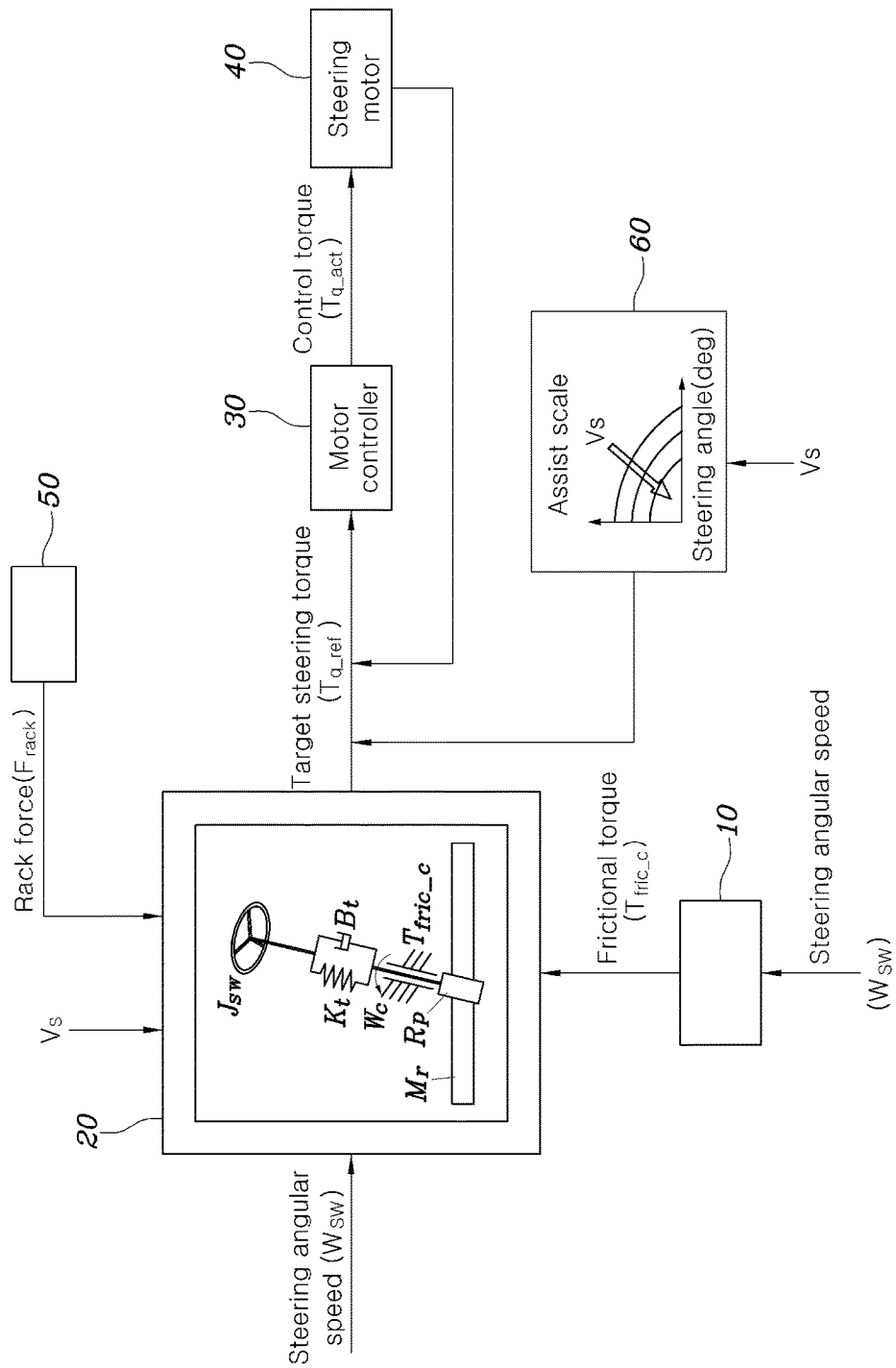
FIG. 2 is a diagram of a motor driven power steering control system according to an exemplary embodiment of the present invention.

FIG. 1 is a flowchart of a motor driven power steering control method according to an exemplary embodiment of the present invention. FIG. 2 is a diagram of a motor driven power steering control system according to an exemplary embodiment of the present invention.

Referring to FIG. 1 and FIG. 2, a motor driven power steering control method according to an exemplary embodiment of the present invention includes: a step S100 of setting a virtual friction model to a column connected between a steering wheel and a rack gear; a step S200 of calculating a frictional torque of the column by taking a steering angular speed of the steering wheel as an input parameter in the set virtual friction model; and a step S300 of calculating a target steering torque on the basis of a virtual steering system model using the calculated frictional torque of the column as a parameter.

The virtual steering system model according to the exemplary embodiment of the present invention is a rack-motor driven power steering system (R-MDPS) using a rack gear, and a structure in which a column is provided between a steering wheel and a rack gear and a pinion gear formed in the column is connected to the rack gear may be exemplified.

The conventional Dahl friction model expresses a frictional force as a differential equation for a stress-strain curve to estimate dynamic characteristics of the steering wheel and the column. The hysteresis characteristics according to displacement are reflected as a function of the symbols of displacement and speed.

However, the Dahl friction model cannot reflect the stiction and Stribeck effect of the column, and cannot accurately estimate the frictional characteristics of the actual column in a stop or low-speed driving condition.

In detail, the Dahl friction model can reflect the frictional force ($F=F_C$ sgn(v)) for a vertical load, and the viscosity ($F=F_v|v|^{\delta_v}$ sgn(v)) for speed, but cannot reflect a stiction phenomenon by a stick-slip of the column and also cannot reflect the Stribeck effect. Fc and Fv are the magnitudes of the friction force measured when v=0, and $\delta_v$ is the coefficient by which the friction force increases as the speed increases. For reference, the frictional force according to the stiction and Stribeck effect is as follows.

$$F = \begin{cases} F_e & \text{if } v = 0 \text{ and } |F_e| < F_S \\ F_S \text{sgn}(F_e) & \text{if } v = 0 \text{ and } |F_e| \geq F_S \end{cases}$$

$$F = \begin{cases} F(v) & \text{if } v \neq 0 \\ F_e & \text{if } v = 0 \text{ and } |F_e| < F_S \\ F_S \text{sgn}(F_e) & \text{otherwise} \end{cases} \quad F(v) = F_C + (F_S - F_C)e^{-\left|\frac{v}{v_\sigma}\right|^{\delta_\sigma}} + F_v v$$

To solve the problems, the frictional torque calculating unit 10 according to the exemplary embodiment of the present invention may calculate the frictional torque of the column by taking the steering angular speed of the steering wheel as an input parameter in the virtual friction model set to the column connected between the steering wheel and the rack gear.

The target steering torque calculating unit 20 may calculate a target steering torque on the basis of a virtual steering system model which utilizes the frictional torque of the column calculated by the frictional torque calculating unit 10 as a parameter.

The motor control unit 50 may control the steering motor 40 by using the target steering torque calculated by the target steering torque calculating unit 20.

In an exemplary embodiment of the present invention, the motor control unit 50 may include the target steering torque calculated by the target steering torque calculating unit 20 in the motor control unit 50.

Accordingly, by estimating the frictional torque of the column such that the frictional torque of the column concords with the reality when the target steering torque is calculated, the vibration of the steering system may be improved by enhancing the accuracy of estimating the frictional torque of the column.

In the step S100 of setting the virtual friction model, the virtual friction model may be set to reflect the striction and Stribeck effect of the column.

Accordingly, the vibration problem occurring during a prompt steering operation in a stop or low-speed driving condition may be solved, making it possible to secure the fixing of the target steering torque generation.

Figure 3:
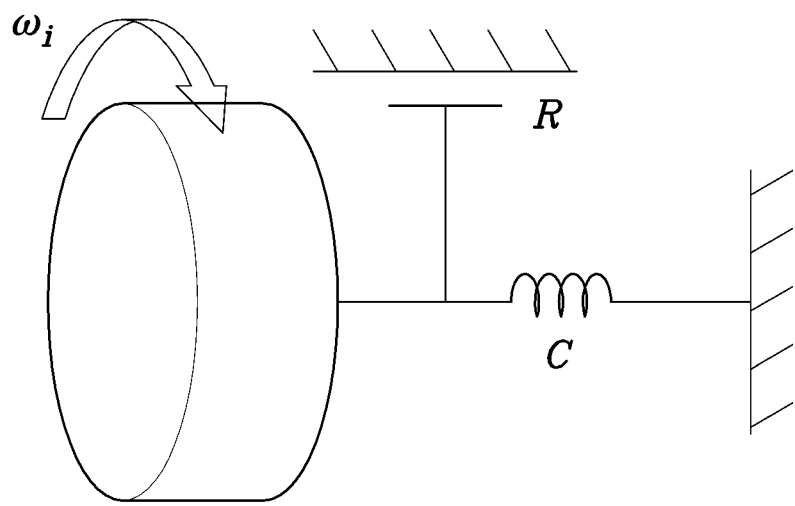
FIG. 3 illustrates a virtual friction model according to an exemplary embodiment of the present invention.

FIG. 3 illustrates a virtual friction model according to an exemplary embodiment of the present invention.

Referring further to FIG. 3, according to the virtual friction model according to the exemplary embodiment of the present invention, the column is rotated due to rotation of the steering wheel made by a driver, and accordingly, it may be set such that a damping torque and a stiffness torque due to torsion may be generated.

In detail, in the step S100 of setting the virtual friction model, in the virtual model, the frictional torque $T_{fric\_c}$ of the column may be set to a sum of a damping torque $T_R$ and a stiffness torque $T_C$ set as nonlinear functions for the steering angular speed or a torsion displacement of the column.

That is, the frictional torque $T_{fric\_c}$ may be estimated as a sum of the damping torque $T_R$ and the stiffness torque $T_C$ that are nonlinear functions, respectively, and the virtual friction model may be set such that the frictional torque $T_{fric\_c}$ for the steering angular speed $\omega_i$ is set to a nonlinear function.

Figure 4:
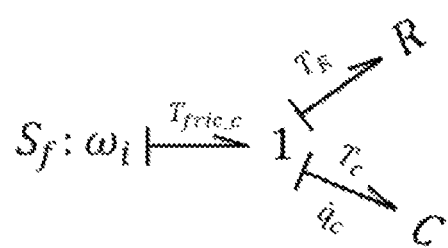
FIG. 4 illustrates a bond graph expressing the frictional torque estimated as a sum of the damping torque and the stiffness torque.

In detail, this is expressed by a bond graph in FIG. 4.

Figure 5:
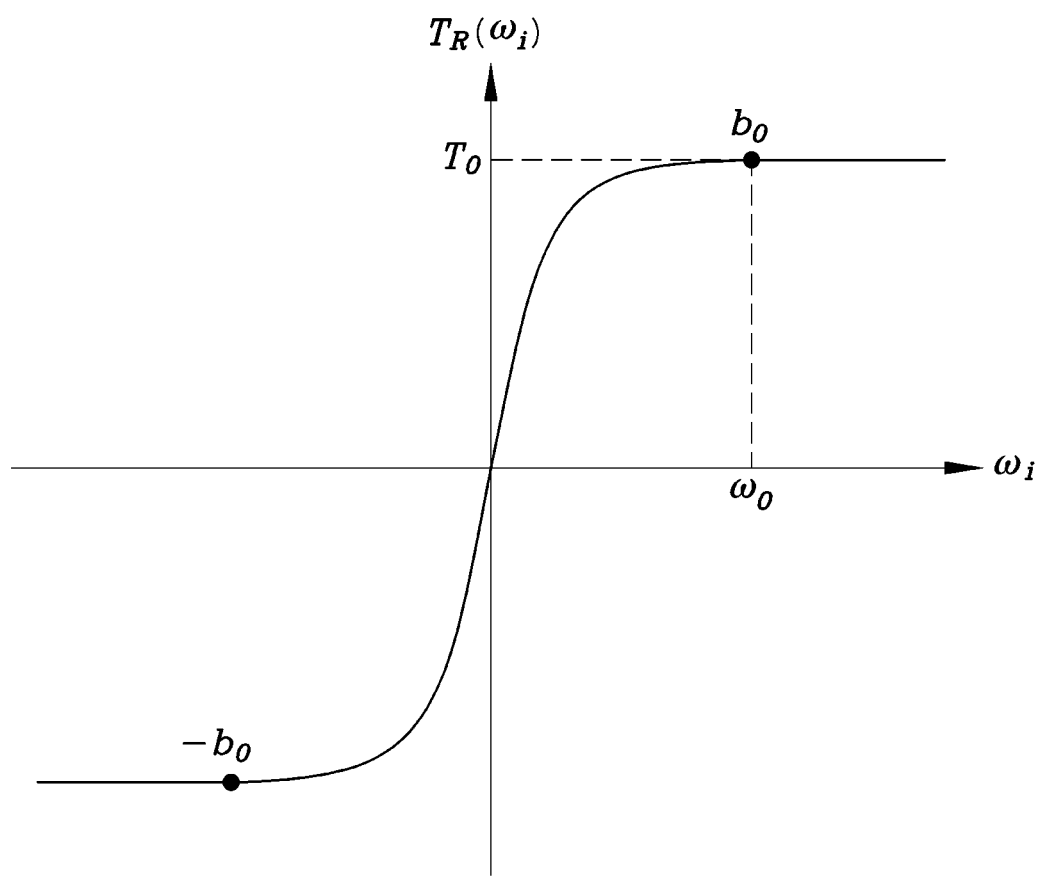
FIG. 5 is a graph of a damping torque according to an exemplary embodiment of the present invention.

FIG. 5 is a graph of a damping torque $T_R$ according to an exemplary embodiment of the present invention.

Referring further to FIG. 5, the damping torque $T_R$ according to the exemplary embodiment of the present invention may set the steering angular speed $\omega_i$ of the steering wheel as a hyperbolic tangent function in which the steering angular speed $\omega_i$ of the steering wheel is an input parameter. As an example, the damping torque $T_R$ may be set in the following equation.

$$T_R(w_i) = T_0 \tan h(\alpha \omega_i)$$

Here, $\alpha$ is a constant preset by the following equation.

$$\alpha = \frac{\tanh^{-1}(\beta)}{\omega_0}$$

Here, $\omega_0$, $T_0$, and $\beta$ are tuned parameter values, and, $\beta$ may be a ratio of the damping torques $T_R$ and $T_0$ at $\omega_0$.

Figure 6:
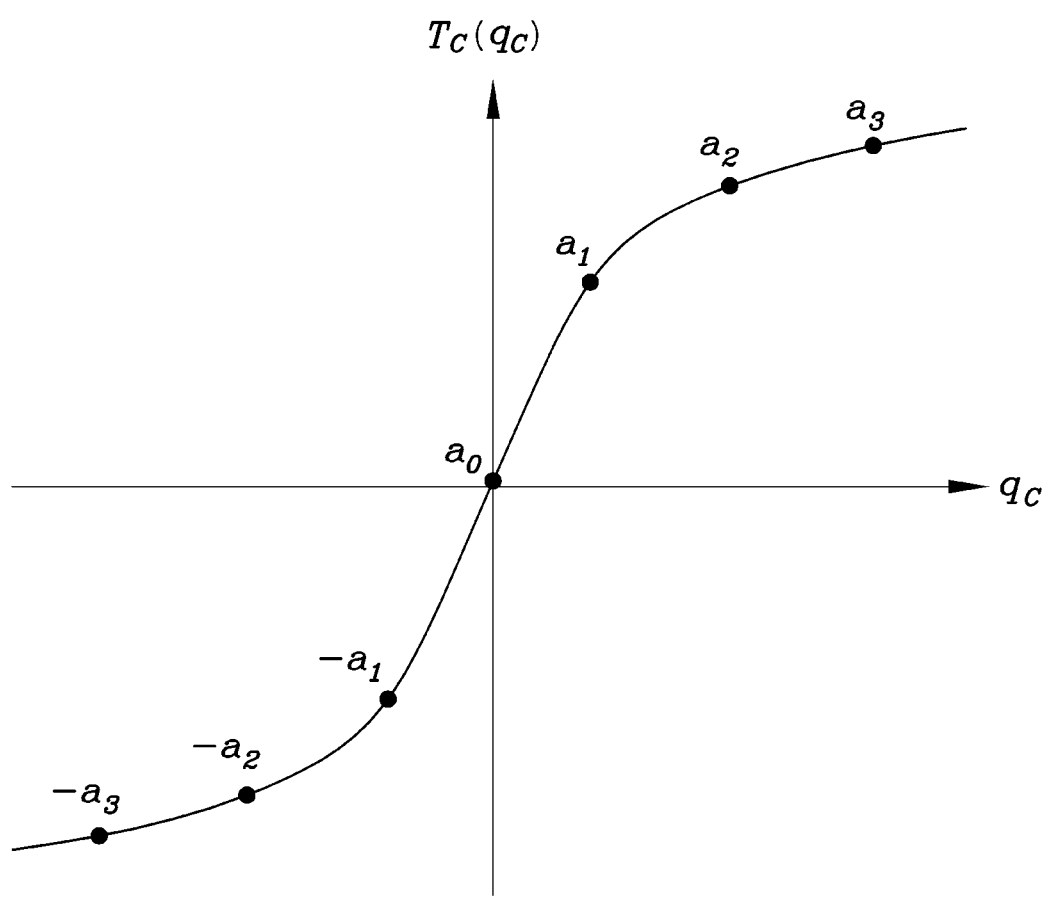
FIG. 6 is a graph of a stiffness torque according to an exemplary embodiment of the present invention.

FIG. 6 is a graph of a stiffness torque $T_C$ according to an exemplary embodiment of the present invention.

Referring further to FIG. 6, the stiffness torque $T_C$ according to the exemplary embodiment of the present invention may set to a polynomial function of two degrees or more in which the torsional displacement $q_C$ of the column is an input parameter. Here, the torsional displacement $q_C$ of the column is a compliance value, and may be a rotational displacement (degree) which is deformed due to the rotation of the steering wheel in correspondence to the torsional stiffness of the column. As an example, the stiffness torque $T_C$ may be set to a cubic polynomial function in which the torsional displacement $q_C$ is an input parameter as in the following equation.

$$T_C(q_C) = k_3 q_C^3 + k_2 q_C^2 + k_1 q_C + k_0$$

Here, $k_0$, $k_1$, $k_2$ and $k_3$ may be tuned parameter values.

Figure 7:
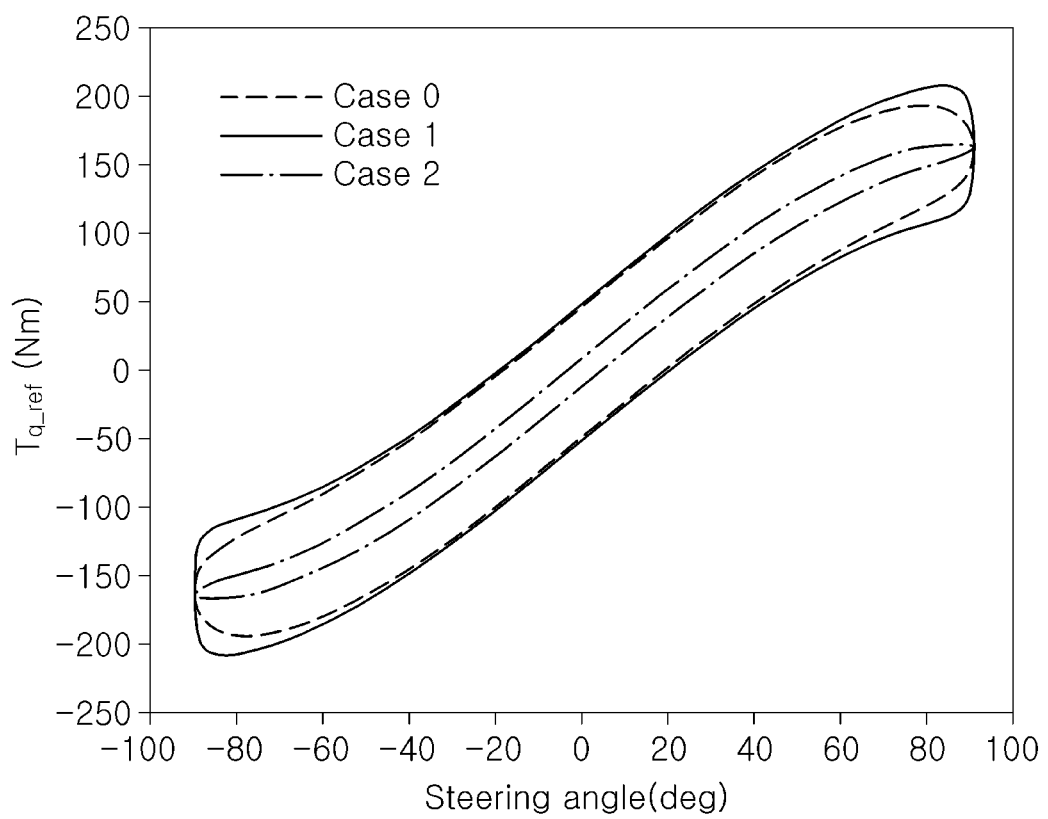
FIG. 7 and FIG. 8 illustrate a graph depicting a relationship between a steering angle and a target steering torque according to an exemplary embodiment of the present invention and FIG. 9 illustrates a bond graph expressing an equation of state for a virtual steering system model.
Figure 8:
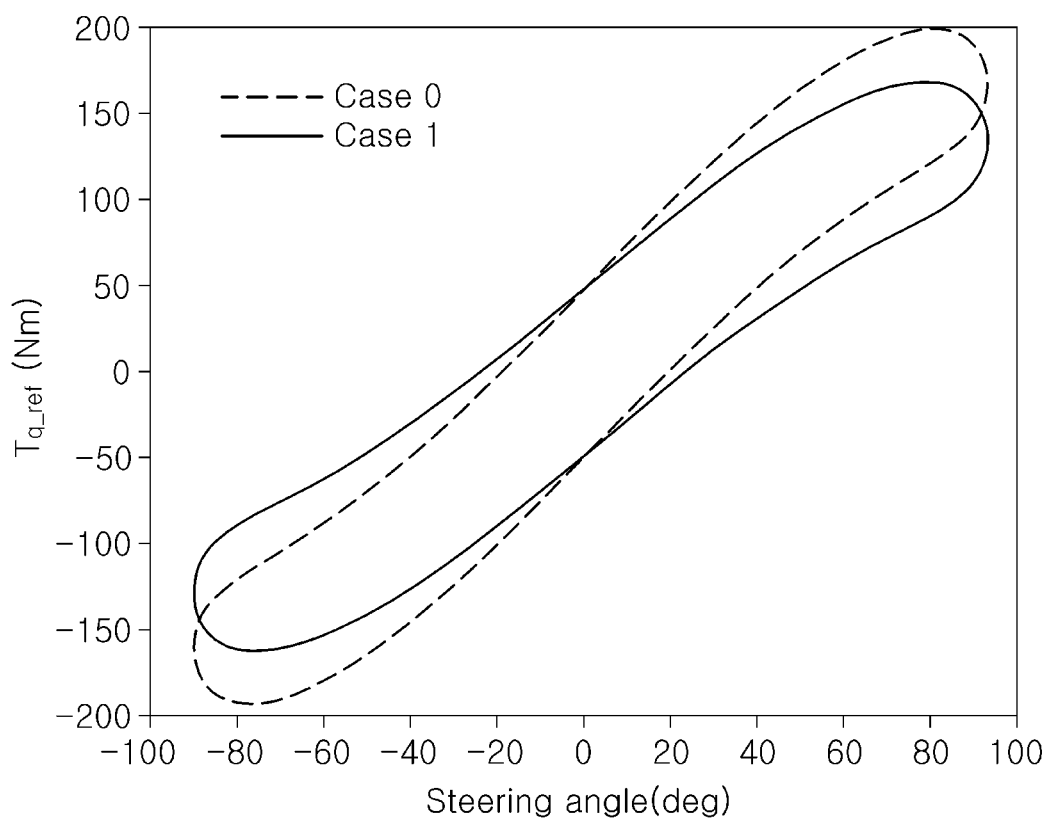

FIG. 7 and FIG. 8 illustrate a graph depicting a relationship between a steering angle and a target steering torque $T_{q\_ref}$ according to an exemplary embodiment of the present invention.

Referring to further to FIG. 7 and FIG. 8, the above-described tuned parameters $\omega_0$, $\beta$, $T_0$, $k_0$, $k_1$, $k_2$ and $k_3$ may be turned as in the following table. The graph of the stiffness torque $T_C$ may be tuned to be symmetrical with respect to the origin by setting $k_0$ and $k_2$ to 0.

| Parameter | Function | Value |
|---|---|---|
| $\omega_0$ | $T_R$ | $80\pi/180$ |
| $\beta$ | $T_R$ | 0.5 |
| $T_0$ | $T_R$ | 50 |
| $k_0$ | $T_C$ | 0 |
| $k_1$ | $T_C$ | 148 |
| $k_2$ | $T_C$ | 0 |
| $k_3$ | $T_C$ | −18 |

In detail, referring to FIG. 7, Case 0 illustrates a graph of a relationship between the steering angle and the target steering torque $T_{q\_ref}$ in a state in which the parameters are tuned as in the table, and Case 1 illustrates a graph of a relationship between the steering angle and the target steering torque $T_{q\_ref}$ in a state in which $\beta$ increases to 0.9 (as $\alpha$ increases).

Comparing Case 1 and Case 0, $\beta$ (or $\alpha$) influences the target steering torque $T_{q\_ref}$ in an area having a large steering angle, which is a peripheral area of the graph for the target steering torque $T_{q\_ref}$. As $\beta$ (or $\alpha$) increases, a sharper shape appears to be in a peripheral area of the graph for the target steering torque $T_{q\_ref}$.

Furthermore, Case 2 illustrates a graph of a relationship between the steering angle and the target steering torque $T_{q\_ref}$ in a state in which $T_0$ decreases to 10. When Case 2 is compared with Case 0, the graph for the target steering torque $T_{q\_ref}$ represents a shape that becomes narrower in the entire area, and accordingly, the size of the hysteresis decreases.

Accordingly, the target steering torque $T_{q\_ref}$ according to the required steering angle may be tuned by varying the parameter of the damping torque $T_R$.

Furthermore, referring to FIG. 8, Case 0 illustrates a graph of a relationship between the steering angle and the target steering torque $T_{q\_ref}$ in a state in which the parameters are tuned as in the table, and Case 1 illustrates a graph of a relationship between the steering angle and the target steering torque $T_{q\_ref}$ in a state in which $k_1$ and $k_3$ are changed to 120 and −15, respectively.

When Case 1 is compared with Case 0, it may be identified that the inclination of the target steering torque $T_{q\_ref}$ according to the entire steering angle has been changed. As compared with Case 0, the entire inclination decreases in Case 1.

Accordingly, the target steering torque $T_{q\_ref}$ according to the required steering angle may be tuned by varying the parameter of the stiffness torque $T_C$.

In the step S300 of calculating the target steering torque, the virtual steering system model may calculate a target steering torque in an equation of state in which the steering angular speed and the rack force applied to the rack gear are input parameters. The rack force $F_{rack}$ may be estimated by a rack force estimator 30 including a separate rack force estimation model.

In detail, in the virtual steering system model, a steering angular speed $\omega_{sw}$ and a rack force $F_{rack}$ are applied as input parameters, and an inertia $J_{sw}$ of the steering wheel, a stiffness $K_t$ of the column used as a repulsion device, a damper $B_t$ of the column, a frictional torque $T_{fric\_c}$ of the column, the radius $R_p$ of the pinion, and the weight $M_r$ of the rack gear are applied as system characteristic parameters, and a target steering torque $T_{q\_ref}$ may be applied as output parameters by a relationship between the input parameters and the system characteristic parameters.

An equation of state for a virtual steering system model may be derived by using a bond graph, and an example of the bond graph may be expressed as follows. $W_c$ is an angular speed of the column.

Figure 9:
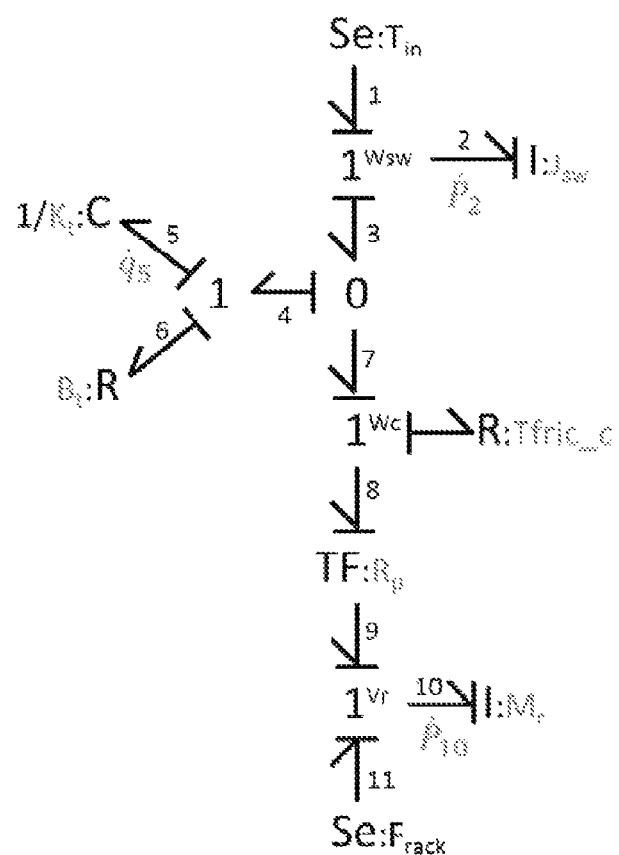

The bond graph is shown in FIG. 9.

Furthermore, in the step S300 of calculating a target steering torque, the equation of state may be derived by setting a torsional displacement of the column, a momentum of the rack gear, a momentum of the steering wheel, and a feeding displacement of the rack gear as state parameters.

In detail, the equation of state is derived by using the bond graph, and the equation of state may be derived by setting a torsional displacement $q_5$ of the column, a momentum $P_{10}$ of the rack gear, a momentum $P_2$ of the steering wheel, and a feeding displacement $q_{13}$ of the rack gear as state parameters, and an example may be calculated as follows. $T_{in}$ is an input torque of the steering wheel, and $T_{fric\_sw}$ is a friction torque acting on the steering wheel.

$$\frac{d}{dt}\begin{bmatrix} q_5 \\ P_{10} \\ P_2 \\ q_{13} \end{bmatrix} = \begin{bmatrix} 0 & -\frac{1}{R_p M_r} & \frac{1}{J_{SW}} & 0 \\ \frac{K_t}{R_p} & -\frac{B_t}{R_p^2 M_r} & \frac{B_t}{R_p J_{SW}} & 0 \\ -K_t & \frac{B_t}{R_p M_r} & -\frac{B_t}{J_{SW}} & 0 \\ 0 & \frac{1}{M_r} & 0 & 0 \end{bmatrix} \begin{bmatrix} q_5 \\ P_{10} \\ P_2 \\ q_{13} \end{bmatrix} + \begin{bmatrix} 0 \\ 0 \\ 1 \\ 0 \end{bmatrix} T_{in} + \begin{bmatrix} 0 \\ 1 \\ 0 \\ 0 \end{bmatrix} F_{rack} + \begin{bmatrix} 0 \\ -\frac{1}{R_p} \\ 0 \\ 0 \end{bmatrix} T_{fric\_c} + \begin{bmatrix} 0 \\ 0 \\ -1 \\ 0 \end{bmatrix} T_{fric\_SW}$$

The present invention calculates a target steering torque $T_{q\_ref}$ applied to the column through a numerical integration of the equation of state, and the target steering torque $T_{q\_ref}$ may be calculated in Equation 1.

$$T_{q\_ref} = K_t \times q_5 \times B_t \times \dot{q}_5 \quad (1)$$

$T_{q\_ref}$: target steering torque
Kt: stiffness of column
q5: torsional displacement of column
Bt: damper of column
$\dot{q}_5$: change rate of torsional displacement of torsion bar The development efficiency of the steering control technology may be increased as the steering performance may be predicted by calculating the target steering torque $T_{q\_ref}$ on the basis of a virtual steering system model, and tuning efficiency may be enhanced by making it possible to freely change the characteristics of the steering system to generate steering feelings of various forms.

When the present invention is applied to a SBW system in which a mechanical connection structure is interrupted between the steering wheel and the steering gearbox, a steering repulsive force and a steering feeling may be generated as if a mechanical steering system was mounted.

Additionally, in the step S300 of calculating the target steering torque, the target steering torque may be calculated while reflecting an assist gain $K_a$ in which the speed Vs of the vehicle is a parameter. The assist gain $K_a$ may be determined by a gain determining unit 60 after the speed Vs of the vehicle is input to the gain determining unit 60.

In detail, the target steering torque $T_{q\_ref}$ may be changed by multiplying the target steering torque $T_{q\_ref}$ calculated by the equation and the assist gain $K_a$ according to the assist gain $K_a$. This may be summarized as in the following equation.

$$T_{q\_ref} = K_a \times (K_t \times q_5 + B_t \times \dot{q}_5)$$

Here, 0<assist gain $(K_a) \le 1$.

That is, when the value of the target steering torque $T_{q\_ref}$ is calculated to be excessively high, the target steering torque $T_{q\_ref}$ may be decreased by applying the assist gain $K_a$.

The assist gain $K_a$ may be a value which is changed by the steering angle and the driving speed of the vehicle. In an exemplary embodiment of the present invention, the assist gain $K_a$ may be mapped in advance to decrease as the steering angle increases, and may be mapped in advance to decrease as the driving speed of the vehicle increases.

After the step S300 of calculating a target steering torque, a step S400 of feedback-controlling the steering motor 40 such that the steering motor 40 follows the calculated target steering torque may be further provided.

That is, the motor control unit 50 may feedback-control the amount of control of the steering motor 40 such that the actual steering torque input to the motor coincides with the target steering torque $T_{q\_ref}$.

Referring to FIG. 2 again, the motor driven power steering system according to an exemplary embodiment of the present invention includes a frictional torque calculating unit 10 configured to calculate a frictional torque of a column, which is connected between a steering wheel and a rack gear, by taking a steering angle or a steering angular speed of the steering wheel as an input parameter in a virtual friction model set to the column; a target steering torque calculating unit 20 configured to calculate a target steering torque on the basis of a virtual steering system model using the frictional torque calculated by the frictional torque calculating unit 10 as a parameter; and a motor control unit 50 configured to control the steering motor 40 by using the target steering torque calculated by the target steering torque calculating unit 20.

Here, the control units such as the frictional torque calculating unit 10, the target steering torque calculating unit 20, and the motor control unit 50 may be implemented by an algorithm configured to control operations of various elements of the vehicle, a nonvolatile memory (not illustrated) configured to store data on a software instruction for reproducing the algorithm, and a processor (not illustrated) configured to perform an operation, which will be described below, by using the data stored in the memory. Here, the memory and the processor may be implemented by individual chips. Alternatively, the memory and the processor may be implemented by an integrated single chip. The processor may take the form of one or more processors.

Figure 10:
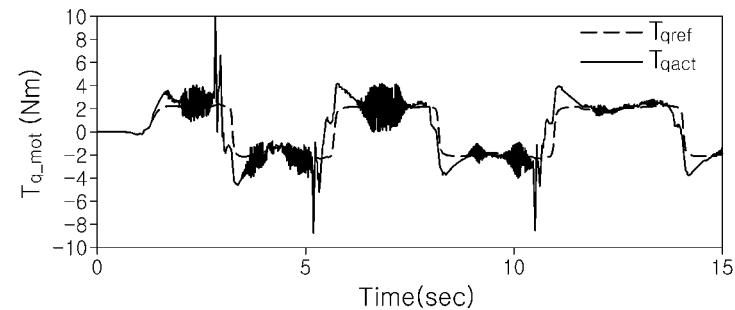
FIG. 10 illustrates a steering torque according to the motor driven power steering control method according to the exemplary embodiment of the present invention, and a control torque of the steering motor according to the steering torque.
Figure 10:
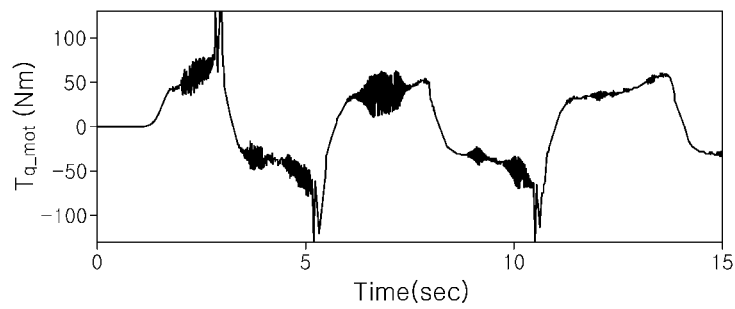
Figure 10:
Figure 10:
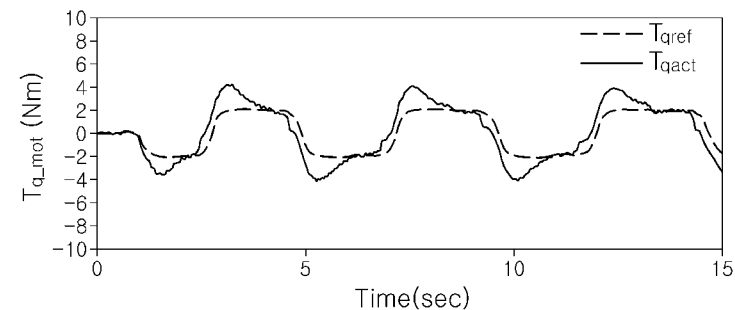
Figure 10:
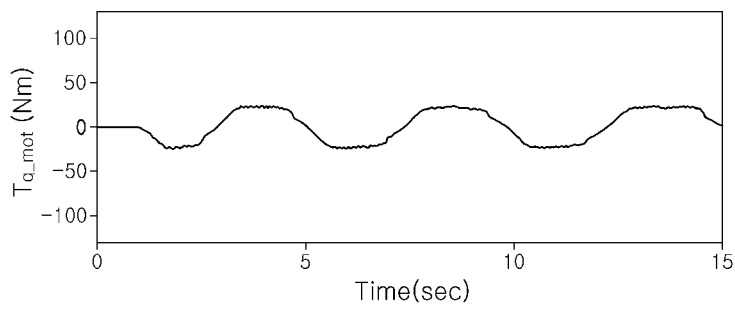

FIG. 10 illustrates a steering torque according to the motor driven power steering control method according to the exemplary embodiment of the present invention, and a control torque of the steering motor 40 according to the steering torque.

Referring to FIG. 10, an evaluation was made in a condition in which the steering wheel is abruptly steered in a state (stop state) in which the driving speed of the vehicle is 0.

In detail, the left side illustrates a steering torque according to the motor driven power steering control method according to the conventional technology and a control torque of the steering motor 40 according to the method. According to the conventional technology, it may be identified that the actual steering torque $T_{q\_act}$ severely vibrates when following the target steering torque $T_{q\_ref}$, and the control torque $T_{q\_mot}$ of the steering motor 40 also severely vibrates.

In contrast, the right side illustrates a steering torque according to the motor driven power steering control method according to the exemplary embodiment of the present invention, and a control torque of the steering motor 40 according to the steering torque. According to the motor driven power steering control method according to the exemplary embodiment of the present invention, it may be identified that the vibration of the actual steering torque $T_{q\_act}$ input to the steering motor 40 is remarkably reduced, and accordingly, the control torque $T_{q\_mot}$ of the steering motor 40 also hardly vibrates.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A motor driven power steering control method comprising:
setting a virtual friction model to a column connected between a steering wheel and a rack gear;
determining, by a controller, a frictional torque of the column by taking a steering angular speed of the steering wheel as an input parameter in the set virtual friction model; and
determining, by the controller, a target steering torque on a basis of a virtual steering system model using the frictional torque of the column as a parameter,
wherein the setting of the virtual friction model includes setting the frictional torque of the column to a sum of a damping torque and a stiffness torque set as nonlinear functions for the steering angular speed or a torsion displacement of the column, in the virtual friction model.

2. The motor driven power steering control method of claim 1, wherein the damping torque is set as a hyperbolic tangent function, in which the steering angular speed of the steering wheel is an input parameter.

3. The motor driven power steering control method of claim 1, wherein the stiffness torque is set as a polynomial function of two degrees or more, in which the torsional displacement of the column is an input parameter.

4. The motor driven power steering control method of claim 1, wherein the setting of the virtual friction model includes setting the virtual friction model to reflect a stiction and Stribeck effect of the column.

5. The motor driven power steering control method of claim 1, wherein the determining of the target steering torque includes setting the virtual steering system model to determine the target steering torque with an equation of state in which the steering angular speed and a rack force applied to the rack gear as input parameters.

6. The motor driven power steering control method of claim 5, wherein the determining of the target steering torque includes deriving the equation of state by setting the torsional displacement of the column, a momentum of the rack gear, a momentum of the steering wheel, and a feeding displacement of the rack gear as state parameters.

7. The motor driven power steering control method of claim 1, wherein the determining of the target steering torque includes determining the target steering torque by reflecting an assist gain set by taking a speed of a vehicle as a parameter.

8. The motor driven power steering control method of claim 1, further including:
after the determining of the target steering torque, feedback-controlling a steering motor to follow the determined target steering torque.

9. A motor driven power steering control system comprising:
a frictional torque determining unit configured to determine a frictional torque of a column, which is connected between a steering wheel and a rack gear, by taking a steering angular speed of the steering wheel as an input parameter in a virtual friction model set to the column;
a target steering torque determining unit configured to determine a target steering torque on a basis of a virtual steering system model using the frictional torque of the column determined by the frictional torque determining unit as a parameter; and
a motor control unit configured to control a steering motor by using the target steering torque determined by the target steering torque determining unit,
wherein the setting of the virtual friction model includes setting the frictional torque of the column to a sum of a damping torque and a stiffness torque set as nonlinear functions for the steering angular speed or a torsion displacement of the column, in the virtual friction model.

10. The motor driven power steering control system of claim 9, wherein the damping torque is set as a hyperbolic tangent function, in which the steering angular speed of the steering wheel is an input parameter.

11. The motor driven power steering control system of claim 9, wherein the stiffness torque is set as a polynomial function of two degrees or more, in which the torsional displacement of the column is an input parameter.

12. The motor driven power steering control system of claim 9, wherein the setting of the virtual friction model includes setting the virtual friction model to reflect a stiction and Stribeck effect of the column.

13. The motor driven power steering control system of claim 9, wherein the determining of the target steering torque by the target steering torque determining unit includes setting the virtual steering system model to determine the target steering torque with an equation of state in which the steering angular speed and a rack force applied to the rack gear as input parameters.

14. The motor driven power steering control system of claim 13, wherein the determining of the target steering torque by the target steering torque determining unit includes deriving the equation of state by setting the torsional displacement of the column, a momentum of the rack gear, a momentum of the steering wheel, and a feeding displacement of the rack gear as state parameters.

15. The motor driven power steering control system of claim 9, wherein the determining of the target steering torque by the target steering torque determining unit includes determining the target steering torque by reflecting an assist gain set by taking a speed of a vehicle as a parameter.

* * * * *